United States Patent [19]
Mittal

[11] Patent Number: 5,860,126
[45] Date of Patent: Jan. 12, 1999

[54] CONTROLLING SHARED MEMORY ACCESS ORDERING IN A MULTI-PROCESSING SYSTEM USING AN ACQUIRE/RELEASE CONSISTENCY MODEL

[75] Inventor: Millind Mittal, South San Francisco, Calif.

[73] Assignee: Intel Corporation, Santa Clara, Calif.

[21] Appl. No.: 768,775

[22] Filed: Dec. 17, 1996

[51] Int. Cl.⁶ .................................................. G06F 12/00
[52] U.S. Cl. ........................... 711/167; 711/147; 711/141
[58] Field of Search .................................. 711/147, 167, 711/141

[56] References Cited

U.S. PATENT DOCUMENTS

| | | | |
|---|---|---|---|
| 5,168,547 | 12/1992 | Miller et al. | 395/821 |
| 5,208,914 | 5/1993 | Wilson et al. | 395/859 |
| 5,363,498 | 11/1994 | Sakuraba et al. | 711/147 |
| 5,566,319 | 10/1996 | Lenz | 711/147 |
| 5,586,331 | 12/1996 | Levenstein | 395/726 |
| 5,623,670 | 4/1997 | Bohannon et al. | 395/726 |

OTHER PUBLICATIONS

"Performance Evaluation of Memory Consistency Models for Shared-Memory Multiprocessor;" Gharachorloo et al.; 1991 ACM 0-89791-380-9/91/0003-0245; 1991; pp. 245-257.

"A Performance Study of Memory Consistency Models;" Zucker et al.; 1992 ACM 0-89791-0509-7/92/0005/0002; 1992; pp. 2-12.

*Primary Examiner*—Tod R. Swann
*Assistant Examiner*—Esteban A. Rockett
*Attorney, Agent, or Firm*—Blakely, Sokoloff, Taylor & Zafman LLP

[57] ABSTRACT

A technique for controlling memory access ordering in a multi-processing system in which a sequence of accesses to acquire, access and release a shared space of memory is strictly adhered to by use of two specialized instructions for controlling memory access. Two instructions noted as MFDA (Memory Fence Directional—Acquire)and MFDR (Memory Fence Directional—Release) are utilized to control the ordering. The MFDA instruction when encountered in a program operates to ensure that all previous accesses to the specified address (typically to a lock controlling access to the shared space) become visible to other processors before all future accesses are permitted. The MFDR instruction when encountered in a program operates to ensure that all previous accesses become visible to other processors before any future accesses to the specified address. The accesses to the shared space of memory are then located between the MFDA and MFDR instructions and made visible to the other processors in proper order with respect to accesses for acquiring and releasing the shared space.

24 Claims, 7 Drawing Sheets

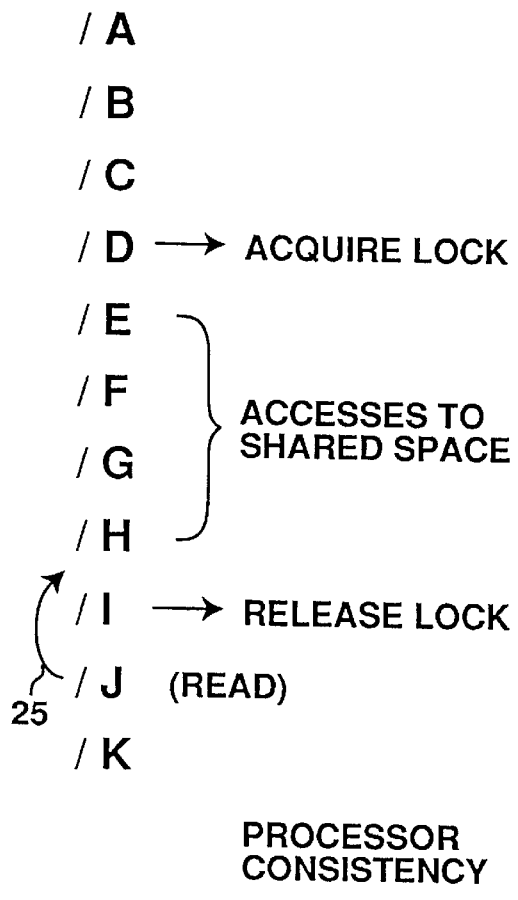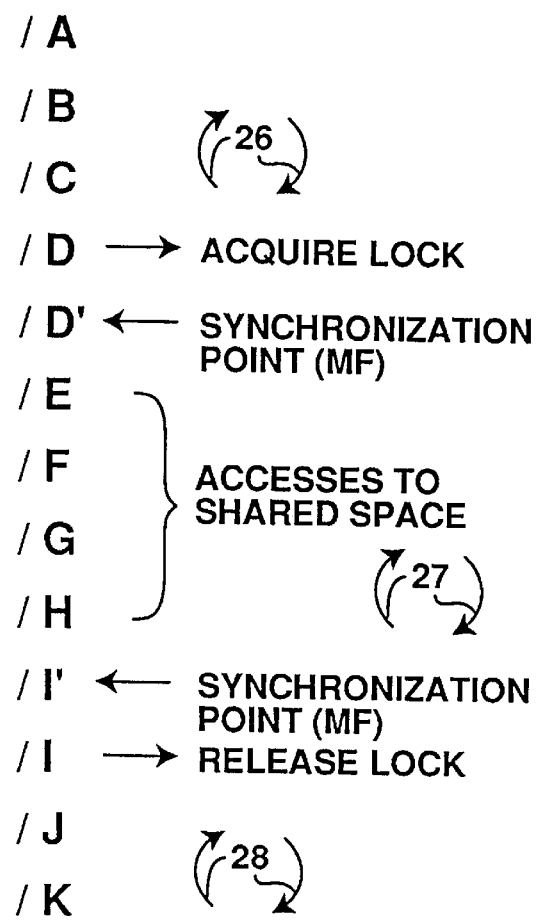
FIG. 5
(PRIOR ART)
FIG. 6
(PRIOR ART)

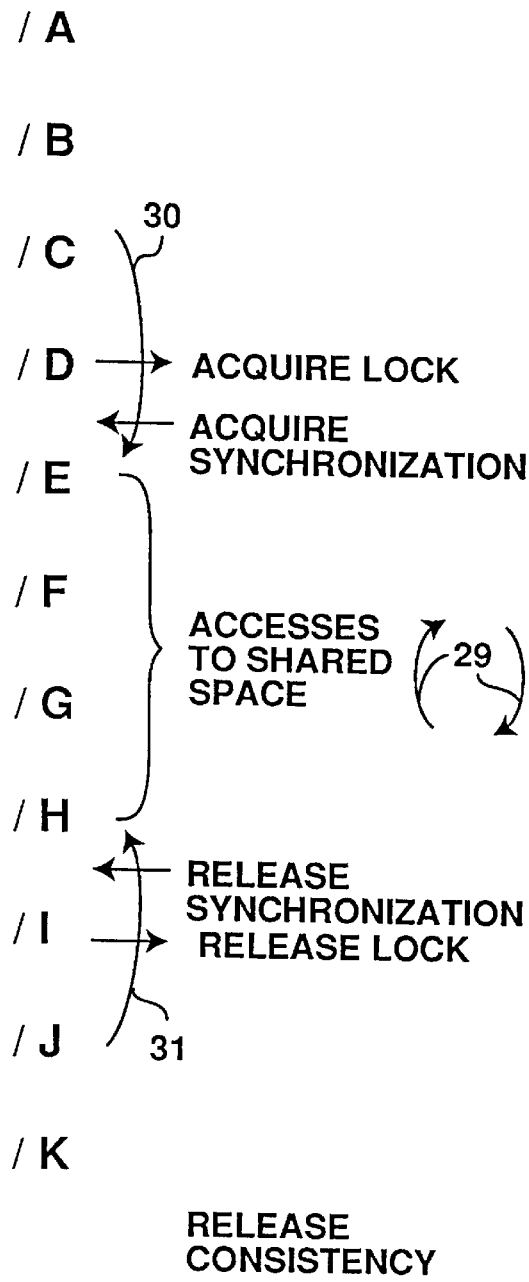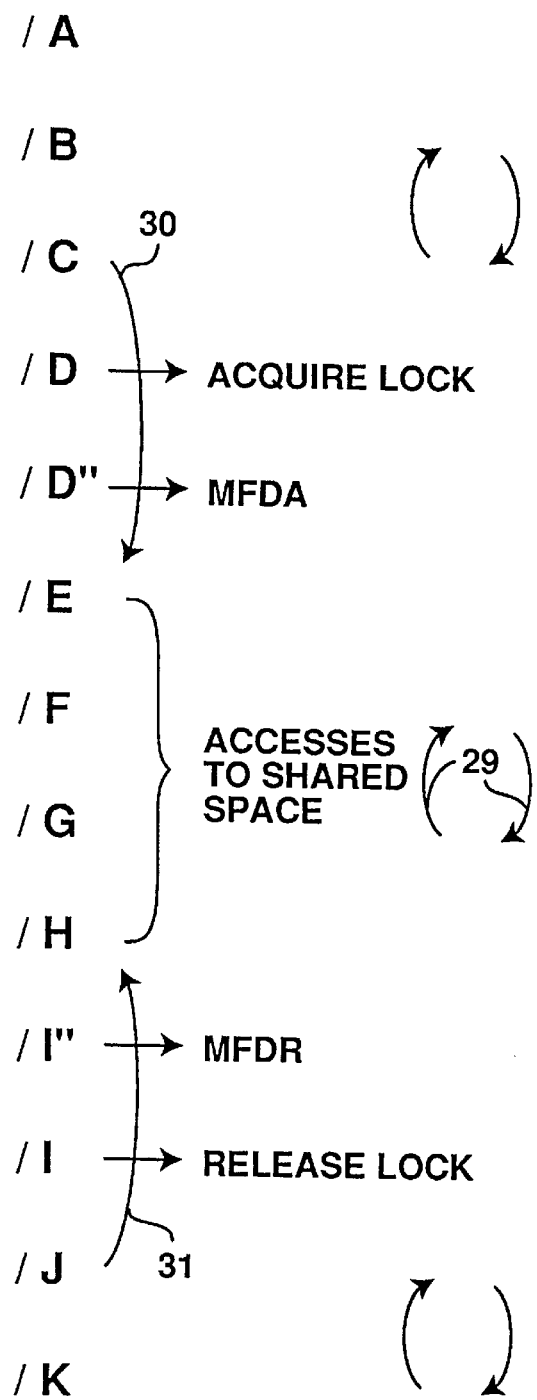
FIG. 7
(PRIOR ART)
FIG. 8

CONTROLLING SHARED MEMORY ACCESS ORDERING IN A MULTI-PROCESSING SYSTEM USING AN ACQUIRE/RELEASE CONSISTENCY MODEL

BACKGROUND OF THE INVENTION

1. Field of the Invention

The present invention relates to the field of processors and, more particularly, to a technique for providing memory access ordering in a multiple processing environment.

2. Background of the Related Art

In an operation of a processor the order in which program instructions are executed is critical to the proper operation of the processor. Where earlier processors executed memory accessing operations in the order in which the instructions were executed by a program, more advanced processors have the capability of changing the order in which the accesses are made to memory, provided that the processor maintains a record of the proper order of the memory accesses. The technique of reordering memory accesses (such as read and write operations to memory) is especially desirable, since such reordering can enhance the speed of data processing. For example, if a particular access to memory is pending for a variety of reasons, the processor can continue with the next access if reordering is permitted. Otherwise, the processor must wait until the current access is completed, before proceeding with the next access. Thus, there is a significant advantage in performance if memory accesses can be performed in the order other than the order required by the program.

Accordingly, in more advanced processors, the ordering of "reads" and/or "writes" (also referred to as "loads" and "stores") from/to memory can be changed from the actual sequence provided by the execution of the program instructions. Again, the processor maintains the necessary control so that the final order of the various results of the accesses is consistent with the program instructions. This is also true, where cache memory or memories are used in conjunction with main memory storage. In that instance, the memory access ordering control is complicated by the maintaining of the location of the valid data, but the overall concept is the same.

However, when multiple processors (or devices capable of accessing memory) are utilized in which a given memory or a portion of a memory is shared by more than one processor, an added constraint is placed on the multiple processor computer system to ensure that the ordering of memory accesses from one processor is made visible to the other processors, according to the order of the program instructions, at least as to the shared memory space. That is, where each individual processor can maintain a record of reordering memory accesses it generates, the other processor(s) may not know that this reordering has occurred. Accordingly, an access to a shared memory location generated by a processor in the system must be observed by (made visible to) the other processor(s) in the same order as noted in the program, unless a mechanism is in place to permit reordering. Otherwise, there exists a possibility that the data obtained by one processor may not be the valid data as required by the program.

One mechanism for controlling accesses to a memory area shared by multiple processors is the use of a semaphore (or flag) as a "key" for obtaining entry into the shared space. In this scheme, a processor can obtain entry into the shared memory area only if it gains access to the "lock" controlling the shared memory area. Only one processor is permitted to gain control of the lock at any one time. Once a processor gains entry into the shared memory area by acquiring the lock, it must then set the semaphore so as to prevent any other processor from gaining entry into the shared space until the lock is released. Typically, a particular address location is designated as the lock and values written to this address location determine the states of the semaphore.

By utilizing the above described locking scheme, reordering of accesses is a concern when accesses are made to acquire or release the lock to the shared memory space. Each processor is generally free to reorder accesses to its non-shared memory space, since this space is not accessed by the other processor(s) and such accesses to non-shared memory space need not be made visible to the other processor(s) in the proper order. It is appreciated that other devices, such as input/output devices, may also require such access ordering control. The access ordering control is important where two accesses must be done in order. Thus, access ordering is not limited to the access of memory only.

Visibility of an access is defined for a read and a write as follows. A read to an address A by a processor P1 is considered visible from the point of view of a second processor P2, if a write to address A issued by P2 cannot change the value read by P1. Likewise, a write to an address A by processor P1 is considered visible from the point of view of a second processor P2, if a read from address A issued by the program cannot return the value of A prior to the write by P1.

The use of semaphores to control accesses to the shared memory space can provide adequate controls once a processor gains entry into the shared space. However, a problem still resides in properly ordering the accesses for acquiring and releasing the lock. Since memory accesses are needed for acquiring and releasing the lock, it is possible for a processor to reorder these accesses in reference to its other memory accesses, including memory accesses to the shared memory space. Since the lock location is shared by the other processor(s) in the system, the accesses to acquire and release the lock may not be visible to the other processors in the proper sequence relative to the accesses to the shared area of memory. Thus, some mechanism is still needed to maintain ordering for memory accesses for acquiring and releasing the lock in order to make these accesses visible.

Accordingly, the present invention provides for a technique of controlling memory access ordering in a system that has multiple memory accessing devices and in which more than one such device is permitted access to a shared location in memory. Furthermore, the technique of the present invention provides memory access ordering through instruction support, but without requiring modifications to existing load and store instructions which are used to access the memory.

SUMMARY OF THE INVENTION

The present invention describes a technique for controlling memory access ordering in a multi-processing system in which a sequence of accesses to acquire, access and release a shared space of memory is strictly adhered to by use of two specialized instructions for controlling memory access ordering. In a multiple processing computer system where processing devices (such as processors) are able to reorder accesses to memory, the proper sequence of acquiring, accessing and releasing the shared space of memory must be maintained by each processor and made visible to the other processors in the program order.

The present invention utilizes two instructions noted as MFDA (Memory Fence Directional—Acquire) and MFDR (Memory Fence Directional—Release) for controlling the memory access ordering to the shared space. The MFDA instruction when encountered in a program operates to ensure that all previous accesses to the specified address (typically the address associated with a lock permitting access to the shared memory location(s)) become visible to other processors before all future accesses are permitted. The MFDR instruction when encountered in a program operates to ensure that all previous accesses become visible to other processors before any future accesses to the specified address.

By using the MFDA and MFDR instructions as synchronization points for acquiring and releasing the lock associated with a shared space, and by programming the accesses to the shared space between the two instructions, the ordering of acquiring, accessing and releasing the shared space is maintained. As to other areas where such ordering is not needed, the accesses can be readily reordered, since the MFDA and MFDR instructions impose the ordering restrictions only to the specified address.

BRIEF DESCRIPTION OF THE DRAWINGS

FIG. 5 shows an ordering scheme for the programming steps of FIG. 3 when a processor consistency model is used.

FIG. 6 shows an ordering scheme for the programming steps of FIG. 3 when a weak consistency model is used.

FIG. 7 shows an ordering scheme for the programming steps of FIG. 3 when a release consistency model is used.

FIG. 8 shows an implementation of the present invention in conforming to the release consistency model of FIG. 7 by using two directional instructions of the present invention to provide acquire and release synchronization points with respect to accesses to the shared memory space.

DETAILED DESCRIPTION OF THE PREFERRED EMBODIMENT

A technique for controlling memory access ordering in a multi-processing system is described. In the following description, numerous specific details are set forth, such as specific instructions, instruction formats, components such as a particular type of memory, processor elements, etc., in order to provide a thorough understanding of the present invention. However, it will be appreciated by one skilled in the art that the present invention may be practiced without these specific details. In other instances, well known techniques and structures have not been described in detail in order not to obscure the present invention. It is appreciated that the present invention is implemented as particular instructions for a processor, but the invention can be practiced in other instruction formats as well.

Figure 1:
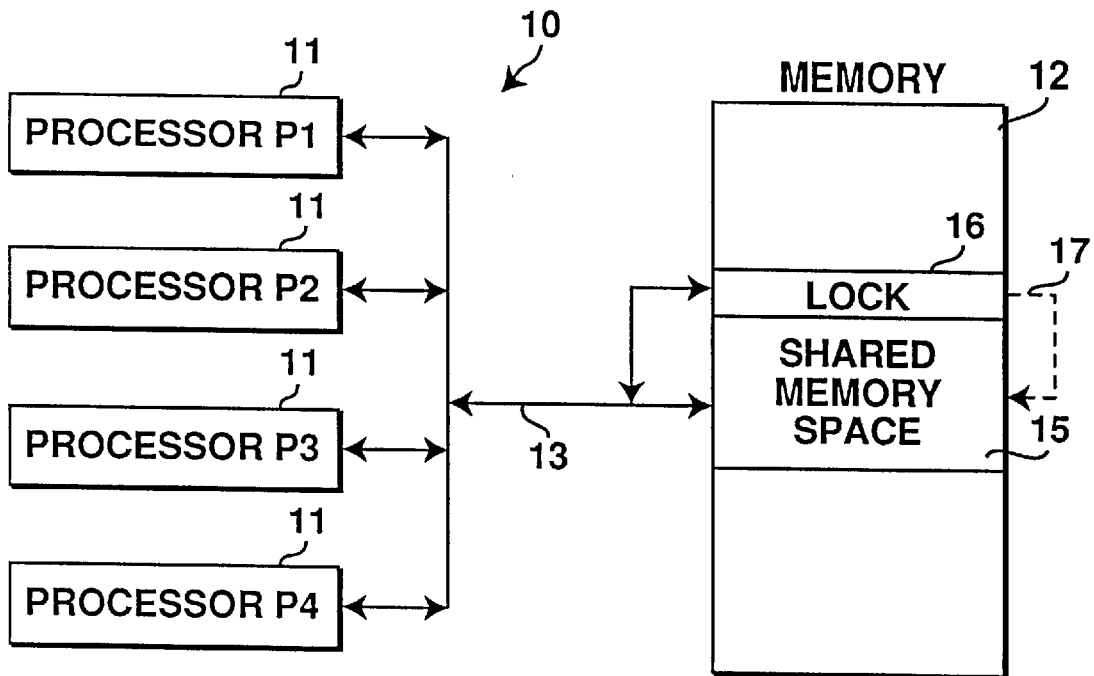
FIG. 1 is a block schematic diagram showing a prior multiple-processor computer system having a plurality of processors coupled to a memory and in which a portion of the memory is accessed by more than one processor, but a lock is used to permit only one processor to access the shared memory space.

In order to understand the memory access ordering scheme and control provided by the present invention, a multiple-processor system and a memory access ordering scheme for operating in such a multiple-processor system must first be understood. Accordingly, an exemplary multiple-processor computer system 10 is illustrated in FIG. 1, in which a plurality of processors 11 operate within the system. The illustration shows four processors 11 (designated P1–P4), although the actual number of such processors 11 is a design choice. All of the processors 11 are coupled to a memory 12 by a bus 13 and specifically to a shared memory space 15 within the memory 12.

It is appreciated that the configuration of the memory 12 can be comprised of a variety of ways. The memory 12 is utilized to store (or save) information (data and/or program instructions) for use by the processors 11. Generally, information is "read" ("loaded") from the memory 12 and information is "written" ("stored" or "saved") into the memory 12 by the processors 11. The general accessing of the memory 12 by each of the processor 11 is well-known in the art. The memory 12 can be of a variety of memories, including RAM (random-access-memory) main memory and/or a mass storage device such as a "hard" disk. It could also be a cache memory. In the particular example, all four of the processors 11 access the memory 12 and in which a selected portion of the memory 12, designated as the shared space 15, is accessed by all four of the processors 11. It is possible that there may be other shared spaces within the memory 12, in which two or more of the processors 11 have the ability to access such shared spaces. The non-shared spaces of the memory 12 are generally relegated to the access by one processor 11 only.

Accordingly, where locations in the memory 12 are accessed by a single processor 11 only, data dependency is the only concern. However, where multiple processors can access locations in memory that are designated as shared locations, such as the shared space 15, some other control must be used to control and limit the accesses so that data being utilized by one processor is not corrupted by a second processor. One technique of implementing such control is by the use of a semaphore. In order to access the shared space, the semaphore (also referred to as a flag, lock or shared variable) is used so that only one processor will have access to the shared space at any given time (at least as to changing the value of the information stored therein).

In FIG. 1, the semaphore employed is a lock (or lock variable) 16, which is assigned to control the accesses to the shared space 15 (as shown by doted-line 17). The lock 16 is a particular location in memory that is assigned to contain a value associated with obtaining accesses to the shared space 15. Thus, in order for one of the processors 11 to access the shared space 15, it must first access the lock 16 and test the state (value) of the data stored in the lock location 16. In the simplest format, two values (for example, bit states 1 and 0) can be assigned to lock 16 to indicate the lock states.

It is to be appreciated that the actual lock values and lock states for the lock 16 is a design choice and many variations can be devised, other than the example described herein.

Also, the location of the lock 16 need not be within the memory 12 itself. It is also possible that other memory accessing devices (devices such as direct memory access controllers) may attempt to access the shared memory space 15. In these instances, these devices would function similar to the processors 11 described herein for gaining access to the shared space 15.

The accessing of the memory 12 by the processors 11 for data transfer typically involves the use of load and store operations. The use of load and store instructions for "read" and "write" operations is well known. Since the lock 16 is at a particular memory location in the example, similar load/store type operations can be used to read and write to the lock 16. A read-modify-write operation using load/store instructions (or other specialized instructions) can be used for acquiring the lock 16. A read-modify-write operation would read the lock value and if the value denotes a condition where access is available (no other processor having access), the value is modified and written back to the lock location. The modified value denotes a locked condition so that when other processors read the value in the lock location 16, access will not be granted. When the original processor no longer requires utilization of the shared space 15, it will write the original value back into the lock location freeing the shared space 15. An example of such a read-modify-write instruction for accessing a lock is described in a patent application titled "Compare And Exchange Operation In A Multiple Processing System;" Ser. No. 08/781,351; filed Jan. 21, 1997 Pending.

Figure 2:
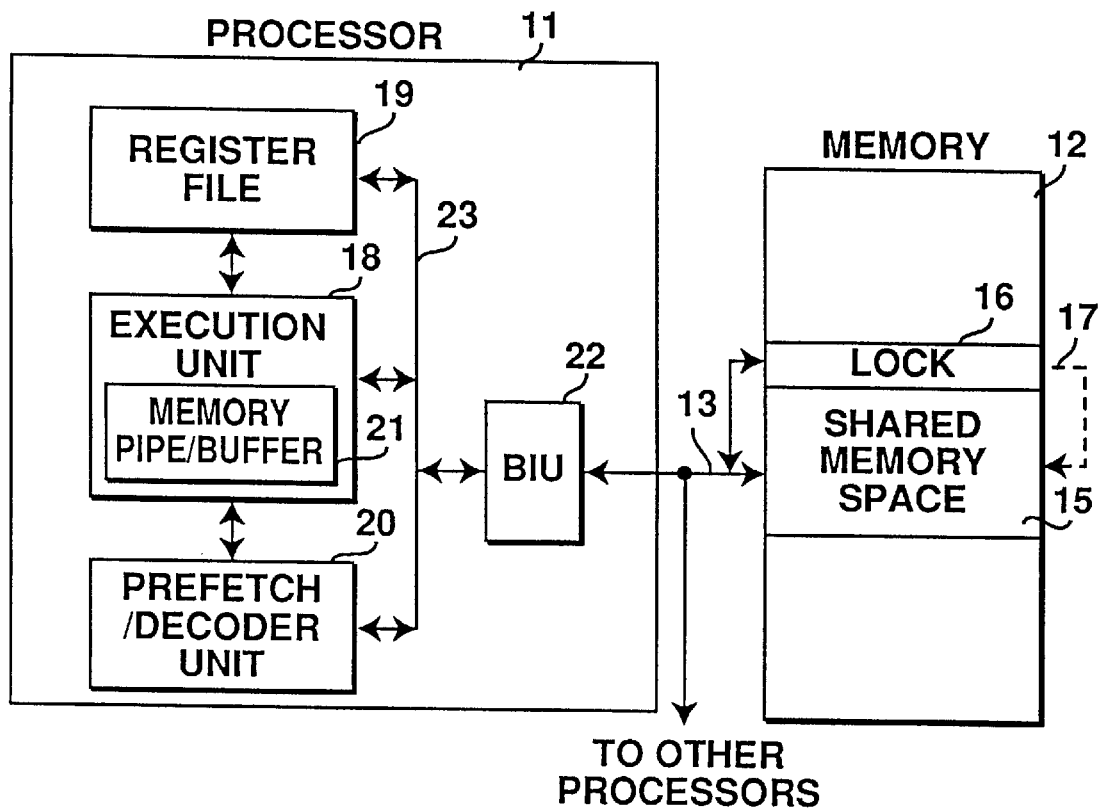
FIG. 2 is a block diagram showing elements of one of the processors for the computer system of FIG. 1.

Referring to FIG. 2, basic elements of a processor required to practice the present invention are shown. Generally, each processor 11 includes an execution unit 18, register file 19 and prefetch/decoder unit 20. The execution unit 18 is the processing core of the processor 11 for executing the various processor instructions. The register file 19 is a set of general purpose registers for storing (or saving) various information required by the execution unit 18. There may be more than one register file in more advanced systems. The prefetch/decoder unit 20 fetches instructions from a storage location (which could be the memory 12) holding the instructions of a program that will be executed and decodes these instructions for execution by the execution unit 18. In more advanced processors utilizing pipelined architecture, future instructions are prefetched and decoded before the instructions are actually needed so that the processor is not idle while waiting for the instructions to be fetched when needed. A memory pipeline buffer (buffer memory) is used to store memory access operations which are pending in the pipeline for memory access. This general concept for storing and retiring pending accesses is known in the art. One example is described in a patent application titled "Apparatus And Method Of Maintaining Processor Ordering In A Multiprocessor System" by Nitin V. Sarangdhar; Ser. No. 08/177,259; filed Jan. 4, 1994.

The various units of the processor 11 are coupled to an internal bus structure 23. A bus interface unit (BIU) 22 provides an interface for coupling the internal bus 23 to the external bus 13. It is appreciated that the structure of the buses 13 and/or 23 may take various forms. Furthermore, it is appreciated that the processor 11 actually includes many more components than just the components shown in FIG. 2.

Figures 3, 4:
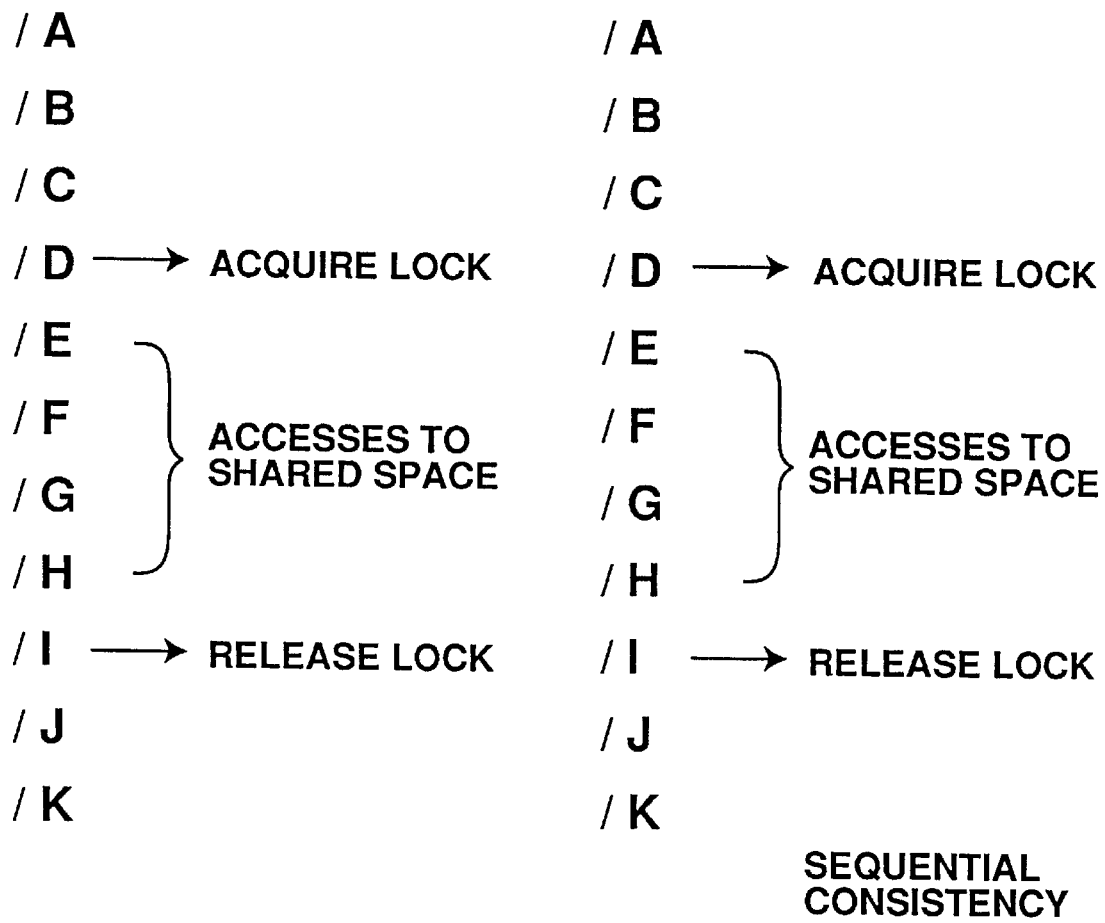
FIG. 3 shows a sequence of program steps for the processor of FIG. 2, including accesses to acquire and release the lock which control the accesses to the shared space of the memory.
FIG. 4 shows an ordering scheme for the programming steps of FIG. 3 when a sequential consistency model is used.

Referring to FIG. 3, a program sequence for one of the processors 11 (P1 is used in the example herein) is shown comprised of a sequence of memory accesses noted as A–K. The ordering of accesses A–K corresponds to the order required by the program instructions. Accesses E–H are shown as accesses to the shared memory space 15 of FIGS. 1 and 2. Thus, acquiring of the lock 16 must be achieved prior to performing access E. In the example, access D is used to acquire the lock 16. Once the accesses E–H to the shared space 15 are completed, access I is used to release the lock 16. Then, accesses J–K are performed.

It is appreciated that access D to acquire the lock 16 and access I to release the lock 16, may each be performed by one instruction or multiple instructions. However, what is important is that the execution be performed as atomic operations, so that once execution commences to acquire or release the lock 16, the particular operation will not be interrupted by another instruction. Generally, the preference is to use a single instruction, such as a read-modify-write instruction, for access D and a single instruction for access I.

It is imperative that the programming order for acquiring the lock 16, utilizing the shared space 15 and releasing the lock 16 be made visible to the other processors in the proper order as the program order. However, once the shared space 15 is acquired, the processor is free to reorder the accesses to the shared space 15. Stated alternatively, accesses E–H must occur after the lock 16 is acquired and must be completed prior to the release of the lock 16 to ensure integrity of the shared space 15.

Since there are a number of memory access ordering or reordering schemes available, it is useful to identify pertinent access ordering schemes to determine if any are adaptable for achieving the desired properties noted above. Accordingly four models (called "consistencies") are described below in reference to the FIGS. 4–7. The four models are the "sequential", "processor", "wear" and "release" consistencies.

Referring to FIG. 4, the sequential consistency ordering model as applied to the sequence of program steps of FIG. 3 is shown. Sequential consistency model is a memory access ordering model that requires that the execution of programs on different processors should appear as some interleaving of the execution of the programs in one processor. The sequential consistency access model is satisfied if for each processor no reads or writes are re-ordered with respect to previous reads or writes. That is, no memory access reordering is permitted at all and accesses A–K are performed in the sequential program order. Thus, reordering of accesses is not a concern with the sequential consistency model.

In FIG. 5, the processor consistency ordering model is illustrated. The processor consistency model is a memory access ordering model that requires that all accesses with respect to a write in a first program become visible to a second program in the same order as specified in the first program (which also implies that reads from the second program become visible to the first program in the same order as specified in the second program). The processor consistency access model can be implemented simply by allowing only future reads to be out of order with respect to writes.

FIG. 5 also shows the processor consistency ordering model in operation for accesses A–K. Since access D typically requires at least a read operation, future reads and writes are not permitted to cross this barrier. Also, since access I is typically a write operation, all previous accesses must be made visible first. However, a read access (shown here as access J) can be reordered to transcend access I. This future read reordering is permissible since it does not violate the requirement of confining shared accesses (E–H) within the lock acquire and release boundaries established by accesses D and I.

It is appreciated that either of the above two consistency models can provide the acquire and release ordering control, but the restrictions required of the models provide for a less dynamic system performance. Thus, although either of the two above models can be used to order accesses for the shared space, it is preferred to seek a more flexible model.

Weak consistency is a memory access ordering model that removes any implied ordering requirements between reads and writes. The weak consistency model only requires that the ordering of visibility of reads and writes for a program is enforced explicitly by the program at appropriate synchronization points. The weak consistency model is illustrated in FIG. 6. The weak consistency model does not require the program to distinguish between the acquiring and releasing of a lock. Thus, although a lock is required, the weak consistency model relies on the program to set the synchronization point wherever ordering is to be synchronized.

In FIG. 6, the weak consistency ordering model is illustrated having synchronization points occurring at the lock acquire and release access points. The first synchronization point D' is set just after access D to acquire the lock. The second synchronization point I' is set just prior to access I to release the lock 16. Accesses A–D can be reordered in any manner (as shown by arrows 26), but cannot transcend the synchronization point D'. Reordering of access D with previous accesses A–C is permitted since accesses A–C are not to the shared space 15. The synchronization point D' ensures that accesses E–H occur after the lock 16 has been acquired. Reordering is permitted among accesses E–H (as shown by arrows 27). The second synchronization point I' ensures that all accesses E–H to the shared space 15 is completed before the lock 16 is released. Accordingly, reordering of accesses I–K (as shown by arrows 28) is permitted, since accesses to the shared space 15 have been completed.

The synchronization points D' and I' operate as a barrier to prevent any accesses to cross the synchronization points. One way to achieve the synchronization at points D' and I' is to utilize a Memory Fence (MF) instruction known in the art. The MF instruction ensures that a hard and fast separation occurs at the synchronization points, so that proper ordering is maintained as to the acquire and release of the shared space 15. However, a disadvantage with this model is the inability of any access to transcend the synchronization barrier.

Release consistency is a particular implementation of the weak memory ordering model in which an acquire and a release of a lock are differentiated. The release consistency model is satisfied if all of the accesses from a processor after the access to the lock to acquire the shared data are made visible to other processors after the access to the lock; and all of the accesses from a processor before the access to the lock to release the shared data are made visible to other processors before the access to release the lock.

In FIG. 7, the release consistency ordering model is illustrated having an acquire synchronization point and a release synchronization point. Whereas in the weak consistency model the synchronization points do not differentiate between the different accesses, the acquire and release synchronization points are differentiated in the release consistency model. Thus, utilizing this model, accesses E–H to the shared space 15 can be reordered within the boundaries of the acquire synchronization and release synchronization points (as shown by arrows 29), but cannot be reordered to occur outside of this boundary. Thus, by ensuring that the accesses to acquire and release the lock are disposed beyond the two synchronization points, accesses to the shared space 15 cannot be reordered with respect to the accesses for acquiring and releasing the lock 16.

However, it is to be appreciated that the accesses residing outside of the boundary (accesses A–C and J–K in the example) can be reordered with respect to the accesses for acquiring and releasing the lock. Since these accesses are not to the shared space 15, they can be reordered with respect to the accesses to the shared space 15 (as shown by arrows 30 and 31). Because certain accesses are permitted to transcend the synchronization boundaries, the release consistency model offers the most flexibility and enhanced performance advantage when compared to the other three consistency models. Accordingly, the preferred embodiment described below addresses a technique for providing this release consistency model for reordering of accesses.

The preferred embodiment defines two new instructions for use in an instruction set architecture for a processor. The instructions are for the primary purpose of providing ordering control to shared space(s) of memory so that information is not corrupted in a multiple-processor system, but without restricting the reordering of accesses too severely so that significant flexibility still remains in the system to allow for the reordering of memory accesses.

The two new instructions are defined as a Memory Fence Directional—Acquire (MFDA) instruction and a Memory Fence Directional—Release (MFDR) instruction. It is to be noted that the function of each instruction is what is important and not the names given to the instructions. However, the instruction names are descriptive of the functions performed by the MFDA and MFDR instructions. Each of the two instructions (shown in FIGS. 8–11) is identified by an opcode followed by an address (ADDR). The address ADDR is associated with the address location descriptor for identifying the shared space 15, and typically ADDR is the address location (either full or byte(s) of an address) of lock 16 when the earlier described semaphore technique is used to control accesses to the shared space 15.

Examples of instruction format for the two instructions are:

MFDA (ADDR) and MFDR (ADDR)

It is also to be noted that the ADDR value may be indirectly obtained. For example, the MFDA or MFDR instruction will specify a register (for example, a register in register file 19) which contains the actual ADDR value.

The two instructions are used in the context of providing the requirements of the release consistency model, although the invention can be readily configured to provide for the other consistency models as well. As illustrated in FIG. 8, the MFDA instruction is positioned after the instruction to acquire the lock 16 in the program and is shown at step D" (following access D). The MFDR instruction is positioned before the instruction to release the lock 16 in the program (at step I) and is shown at step I". The address ADDR is attributed to the address of the lock 16 and is present in the accesses to acquire and release the lock 16.

Figure 9:
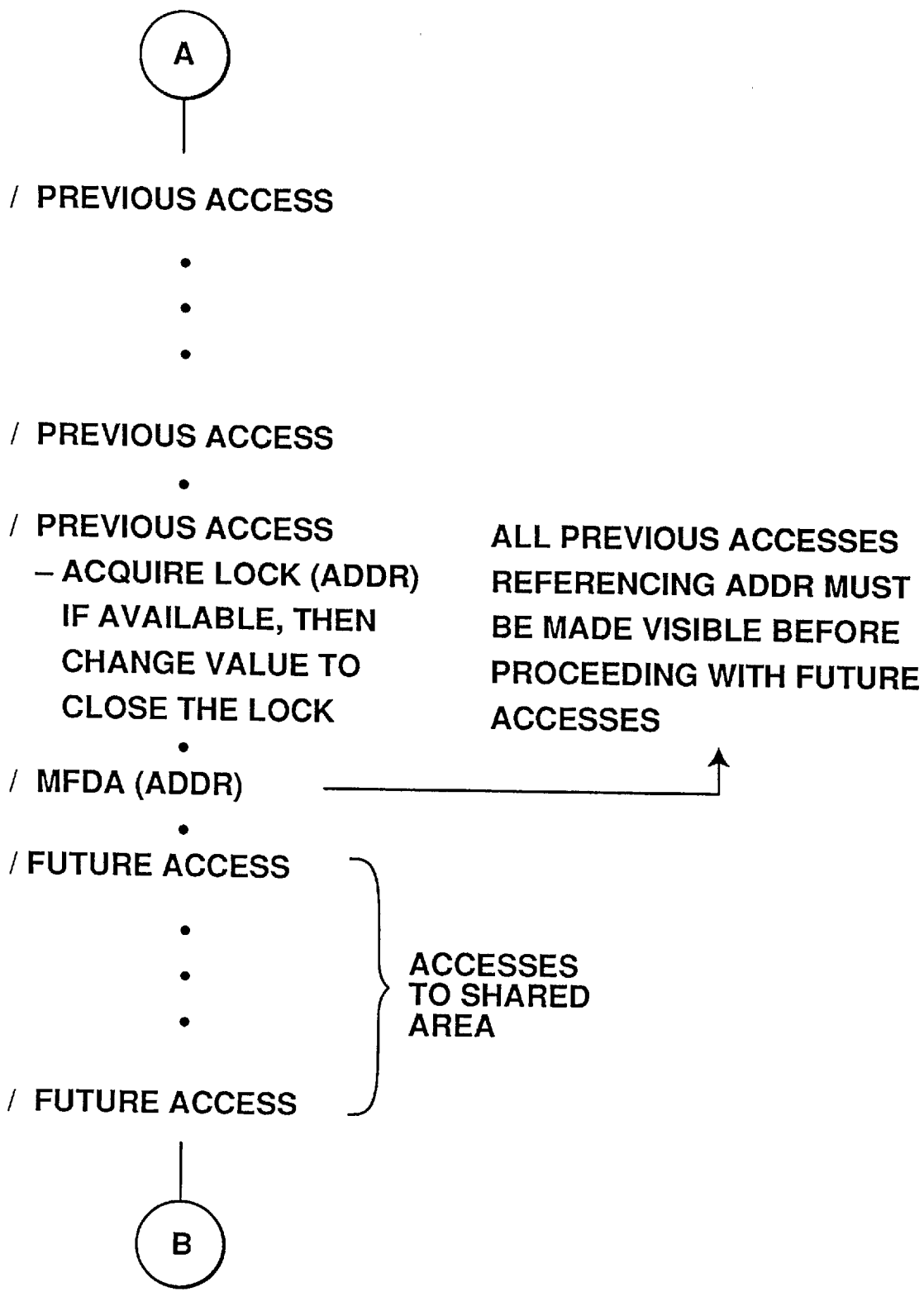
FIG. 9 shows a sequence of program steps in which a MFDA instruction of the preferred embodiment is used to establish a directional acquire synchronization point.

The MFDA instruction, which operation is illustrated in more detail in FIG. 9, causes all previous accesses to the specified address ADDR to become visible to the other processor(s) before all future accesses. Thus, by having ADDR correspond to the lock 16 address, the MFDA instruction ensures that the access to acquire the lock is made visible before proceeding with the accesses E–H into the shared space 15. The MFDA instruction operates as a synchronization boundary only for accesses having the specified ADDR address. Accordingly, in the example of FIG. 8, access D will be made visible prior to proceeding with the accesses following access D". It is to be appreciated that accesses ordered previous to the MFDA instruction (namely, accesses A–C) need not maintain the ordering with respect to the MFDA instruction, as long as these accesses do not reference address ADDR. Thus, accesses A–C can be reordered (even with respect to access D) and transition across the D" MFDA boundary. However, access D cannot transition the D" MFDA boundary. Thus, the ordering between the lock 16 access and accesses to the shared space 15 is not violated.

Figure 10:
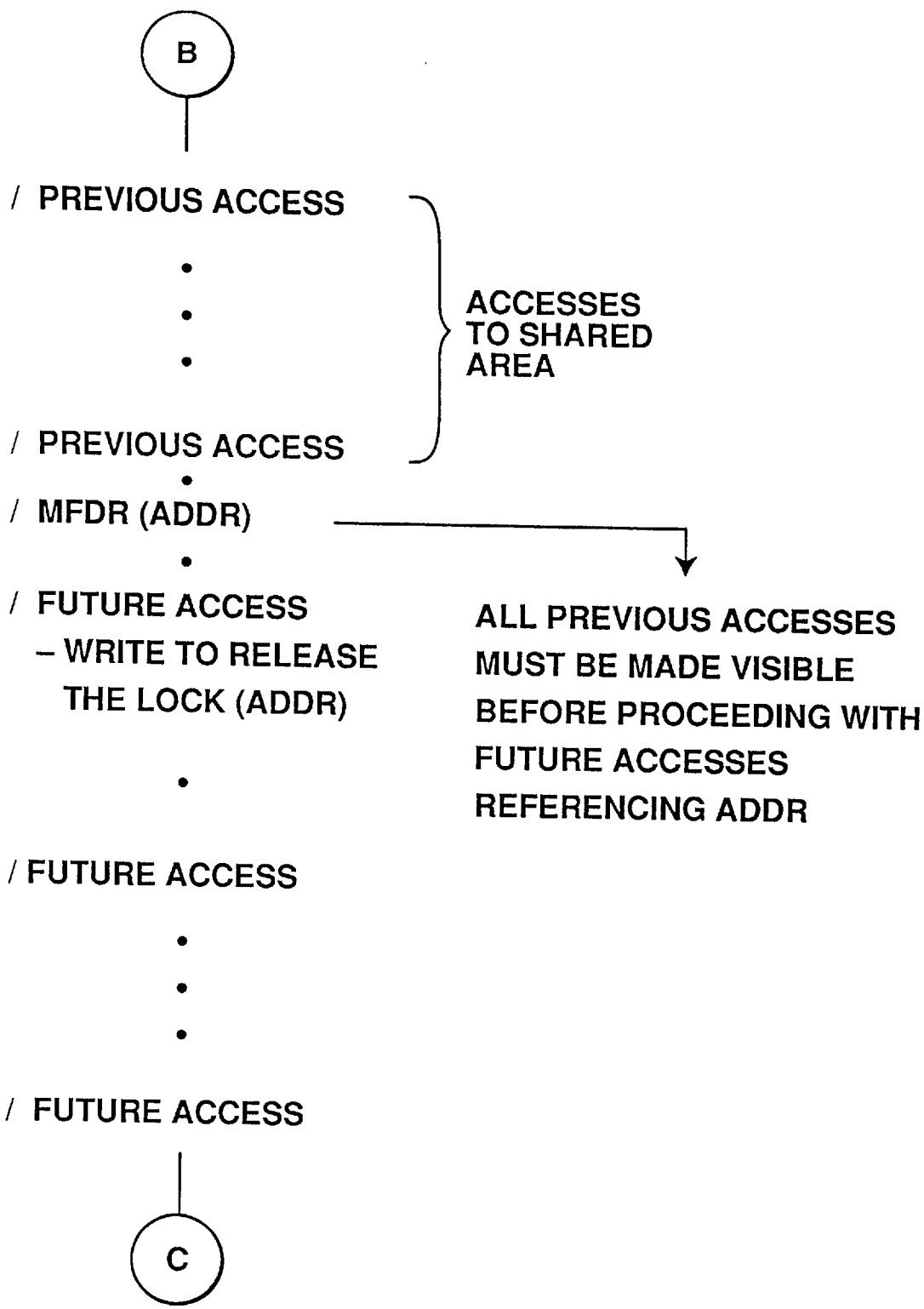
FIG. 10 shows a sequence of program steps in which a MFDR instruction of the preferred embodiment is used to establish a directional release synchronization point.

The MFDR instruction, which operation is illustrated in more detail in FIG. 10, causes all previous accesses to become visible to the other processor(s) before any future accesses to the specified address ADDR. Thus, the MFDR instruction ensures that all accesses ordered prior to the MFDR instruction are made visible prior to the access to release the lock. The MFDR instruction operates as a synchronization boundary only for accesses having the specified ADDR address. Accordingly, in the example of FIG. 8, all accesses prior to the access I are made visible prior to proceeding with access I prior to the releasing of the lock. However, it is to be appreciated that accesses ordered after the MFDR instruction which does not specify an access to ADDR (namely accesses J and K), need not maintain the ordering with respect to the MFDR instruction. Thus, accesses J and K can be reordered (even with respect to access I) and transition across the I" boundary. However, access I cannot transition the I" MFDR boundary.

As implemented in the preferred embodiment, the MFDA and MFDR instructions provide for two directional synchronization points to bracket the accesses to the shared space 15 to not be reordered with respect to the accesses to acquire and release the lock 16. However, the accesses to the shared space 15 can be readily reordered amongst themselves (arrows 29) and accesses not associated with the shared space 15 can readily transition across the MFDA or MFDR boundary (arrows 30 and 31).

Thus, it is appreciated that MFDA and MFDR instructions operate to provide the requirements of the release consistency model, which has the most flexibility for ordering of the four consistency models described. Accordingly, with the practice of the present invention, a memory access reordering is permitted for memory accesses (both reads and writes), with directional reordering synchronization imposed at the occurrence of the MFDA and MFDR instructions, but wherein that reordering synchronization is limited to a particular specified address.

Figure 11:
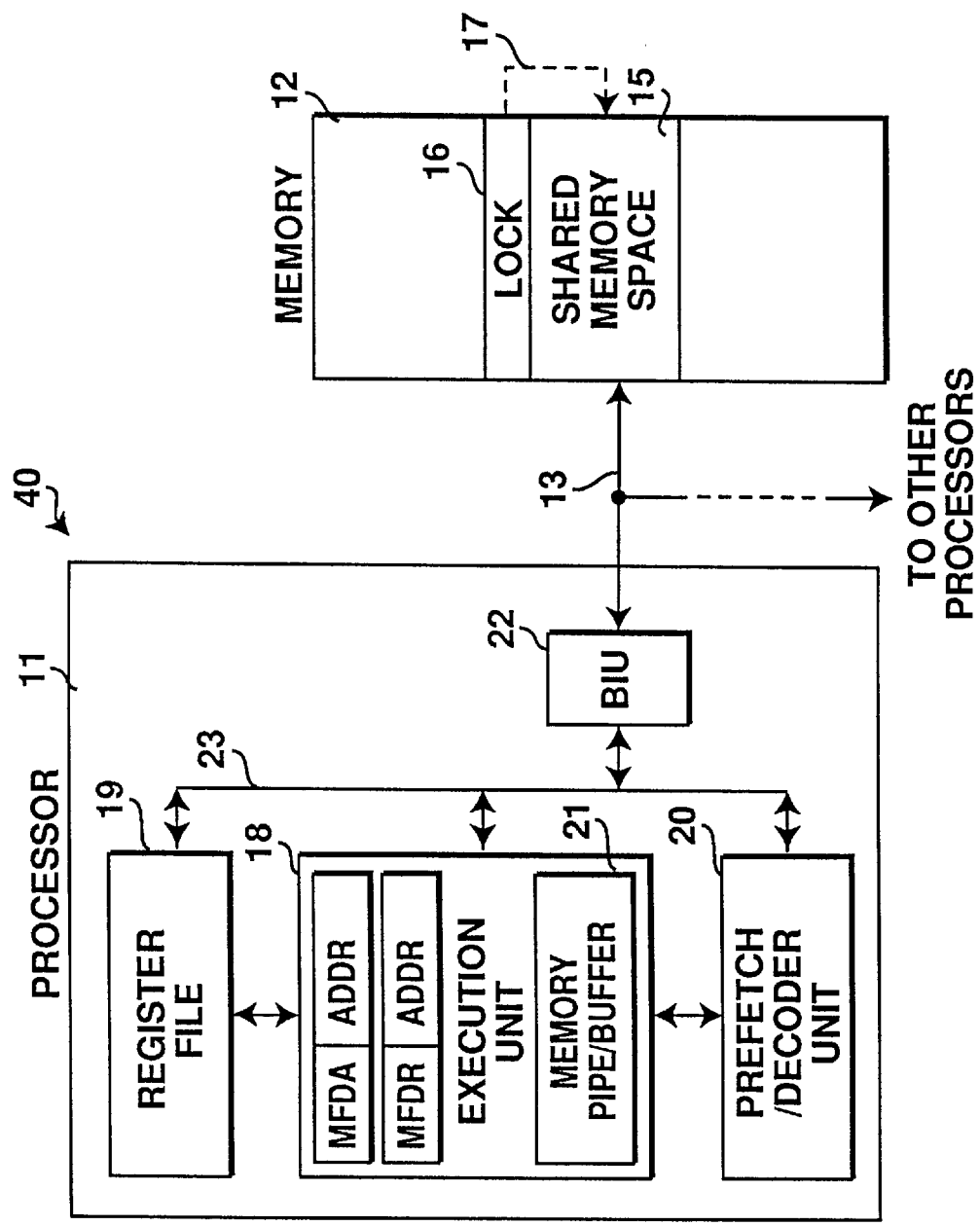
FIG. 11 is a block diagram of a computer system in which the MFDA and MFDR instructions are implemented.

Referring to FIG. 11, a computer system 40 implementing the present invention is shown. The computer system is essentially equivalent to the computer system 10 shown in FIGS. 1 and 2, but now implements the MFDA and MFDR instructions of the preferred embodiment. Accordingly, the computer system is generally implemented in a processing environment where multiple processors (or other processing devices) are utilized and in which the memory 12 includes a shared memory space or location 15. The MFDA and MFDR instructions are shown within the execution unit 18 of the processor 11, where the instructions are executed.

In the particular example, the pipeline memory buffer 21 is used to store pending memory accesses in the pipeline. The MFDA instruction when executed can identify any pending accesses with matching addresses as the specified address ADDR. Thus, any pending acquire lock access would be identified in the buffer 21. The constraints described above requires the acquire lock access to be retired from the buffer 21 (and made visible) before any future accesses are performed.

The same applies to the MFDR instruction. When this instruction is encountered, future accesses can continue until an access matching the specified address is encountered. At this point, all pending accesses in the buffer 21 will be retired before any future accesses can occur. Thus, any pending accesses to the shared space 15 will be made visible prior to the access to release the lock. Again, it is to be stressed that the above description is but one example of implementing the present invention.

The format of the MFDA and MFDR instructions as implemented in the preferred embodiment allow for these instructions to be in similar format as a load/store (read/write) instructions, so that MFDA and MFDR instructions can use the same address path and dependency logic as that of a load and/or store instructions to memory. Accordingly, the present invention can be readily incorporated into a modified load (for access), store (for release) and/or other instructions, if so desired, instead of utilizing separate MFDA and MFDR instructions. That is, a modified load and/or store instruction can incorporate the functionality of the MFDA and MFDR instructions. For example, with a hybrid instruction, the MFDA instruction can be combined with the access instruction for acquiring the lock 16 and the MFDR instruction can be combined with the access instruction for releasing the lock 16. However, when separate MFDA and MFDR instructions are utilized, changes are not needed to the existing load/store instructions of an instruction set architecture. Additionally, because the ordering controls to the shared space 15 are imposed by the MFDA and MFDR instructions (in software), both application and operating system software can utilize these controls.

Thus, it is appreciated that there are a variety of ways to implement the operation of the two instructions. Furthermore, the ordering scheme of the present invention can be implemented in a variety of memory accessing schemes and is not necessarily limited to the just to the processors or to the semaphore example provided herein. It could also be implemented in a single processor environment. Accordingly, a scheme for controlling memory access ordering in a multiple memory accessing or processing system is described.

I claim:

1. A computer system which permits reordering of accesses comprising:

a memory in which shared information can be saved therein at a shared location;

plurality of memory accessing devices coupled to said memory and in which said devices access said shared location by acquiring it;

each memory accessing device capable of responding to an execution of a first instruction which specifies an acquire address associated with acquiring said shared location, wherein said execution of said first instruction causes all previous accesses referencing only said acquire address prior to said first instruction to become visible prior to allowing memory accesses following said first instruction; and each memory accessing device capable of responding to an execution of a second instruction which specifies a release address associated with releasing said shared location, wherein said execution of said second instruction causes all previous accesses prior to said second instruction to become visible prior to allowing accesses referencing said release address following said second instruction.

2. The computer system of claim 1 wherein each of said memory accessing devices is capable of allowing other accesses to memory, which do not reference said acquire address, to be reordered from a program order with respect to said first instruction.

3. The computer system of claim 2 wherein each of said memory accessing devices is capable of allowing other accesses to memory, which do not reference said release address, to be reordered from said program order with respect to said second instruction.

4. The computer system of claim 3 wherein accesses to said memory ordered after said first instruction and prior to said second instruction can be reordered among themselves.

5. The computer system of claim 4 wherein said acquire address and said release address are the same.

6. The computer system of claim 4 wherein said memory accessing devices are comprised of processors.

7. A computer system which permits reordering of accesses from a program order comprising:

a memory in which shared information can be saved therein at a shared location;

plurality of processors coupled to said memory and in which said processors are capable of accessing said shared location by acquiring a lock associated with said shared location;

each processor having an execution unit for executing a first instruction which specifies an acquire address associated with acquiring said lock to acquire access to said shared location, wherein said first instruction causes all previous accesses referencing only said acquire address prior to said first instruction to become visible prior to allowing memory accesses following said first instruction; and said execution unit for executing a second instruction which specifies a release address for releasing said lock to release access to said shared location, wherein said second instruction causes all previous accesses prior to said second instruction to become visible prior to allowing accesses referencing said release address following said second instruction.

8. The computer system of claim 7 wherein each of said processors allows other accesses to memory, which do not reference said acquire address, to be reordered from a program order with respect to said first instruction.

9. The computer system of claim 8 wherein each of said processors allows other accesses to memory, which do not reference said release address, to be reordered from said program order with respect to said second instruction.

10. The computer system of claim 9 wherein accesses to said shared information ordered after said first instruction and prior to said second instruction can be reordered among themselves.

11. The computer system of claim 9 wherein said acquire address and said release address are the same.

12. The computer system of claim 9 wherein each of said processors further includes a buffer memory resident therein for having unexecuted memory accesses of its processor to be saved therein and in which said instructions cause said buffer memory to be accessed to determine if any accesses containing said address are saved therein.

13. In a computer system, a method of utilizing a set of two instructions to maintain an ordering of an access to a shared location, such that accesses referencing and acquire address and a release address associated with acquiring and releasing said shared location is observed in a program order with said access to said shared location, comprising the steps of:

implementing a memory in which at least a portion of said memory can be allocated as said shared location;

implementing a memory accessing device which responds to an execution of a first instruction that specifies said acquire address, wherein said first instruction causes all previous accesses referencing only said acquire address prior to said first instruction to become visible prior to allowing memory accesses following said first instruction;

implementing said memory accessing device which responds to an execution of a second instruction that specifies said release address, wherein said second instruction causes all previous accesses prior to said second instruction to become visible prior to allowing accesses referencing said release address following said second instruction.

14. The method of claim 13 wherein said computer system has more than one memory accessing device and in which said shared location in said memory is accessed by more than one of said memory accessing devices.

15. The method of claim 13 wherein a lock variable is assigned as a semaphore for permitting entry into said shared location and in which only one of said memory accessing devices at a time is permitted access to said shared location.

16. The method of claim 13 wherein said acquire and release addresses are the same.

17. In a computer system, a method of utilizing a set of two instructions to maintain an ordering of an access to a shared location, such that accesses referencing an address associated with said shared location is observed in a program order with said access to said shared location, comprising the steps of:

implementing a memory in which at least a portion of said memory can be allocated as a shared memory, wherein at least one location within said shared memory is defined as said shared location;

implementing a processing device which responds to execute a first instruction which specifies said address for acquiring said shared location, wherein said first instruction causes all previous accesses referencing only said address prior to said first instruction to become visible prior to allowing memory accesses following said first instruction;

implementing said processing device which responds to execute a second instruction which specifies said address for releasing said shared location wherein said second instruction causes all previous accesses prior to said second instruction to become visible prior to allowing accesses referencing said address following said second instruction.

18. The method of claim 17 wherein said shared location in said memory is accessed by more than one of said processing devices.

19. The method of claim 17 wherein a lock variable is assigned as a semaphore for permitting entry into said shared location and in which only one of said processing devices at a time is permitted access to said shared location.

20. In a computer system having a plurality of processors, a method of utilizing a set of two instructions to maintain an ordering of an access to a shared location in memory accessed by more than one of said processors, such that accesses referencing an acquire address and a release address associated with acquiring and releasing said shared location in memory is observed in a program order with said access to said shared location, comprising the steps of:

executing a first instruction which specifies said acquire address wherein said first instruction causes all previous accesses referencing only said acquire address prior to said first instruction to become visible prior to allowing memory accesses following said first instruction;

executing an instruction for accessing said shared location;

executing a second instruction which specifies said release address wherein said second instruction causes all previous accesses prior to said second instruction to become visible prior to allowing accesses referencing said release address following said second instruction.

21. The method of claim 20 further including a step of executing an acquire instruction prior to said first instruction for acquiring access to said shared location, said acquire instruction having said acquire address as part of its instruction.

22. The method of claim 21 further including a step of executing a release instruction after said second instruction for releasing access to said shared location, said release instruction having said release address as part of its instruction.

23. The method of claim 22 wherein other accesses to memory, other than to said shared location in memory and which do not reference said acquire and release addresses, are permitted to be observed out of order from said program order with respect to said first or second instruction.

24. The method of claim 23 wherein said acquire and release addresses are the same.

* * * * *